(12) United States Patent
Smith

(10) Patent No.: US 11,130,186 B2
(45) Date of Patent: Sep. 28, 2021

(54) REPLACEABLE TOOTH FOR A CIRCULAR SAW

(71) Applicant: Quality Chain Canada Ltd., Surrey (CA)

(72) Inventor: Wesley Smith, Surrey (CA)

(73) Assignee: QUALITY CHAIN CANADA LTD., Surrey (CA)

(*) Notice: Subject to any disclaimer, the term of this patent is extended or adjusted under 35 U.S.C. 154(b) by 0 days.

(21) Appl. No.: 17/057,059

(22) PCT Filed: May 24, 2019

(86) PCT No.: PCT/CA2019/050717
§ 371 (c)(1),
(2) Date: Nov. 19, 2020

(87) PCT Pub. No.: WO2019/227201
PCT Pub. Date: Dec. 5, 2019

(65) Prior Publication Data
US 2021/0205907 A1    Jul. 8, 2021

Related U.S. Application Data

(60) Provisional application No. 62/679,691, filed on Jun. 1, 2018.

(51) Int. Cl.
*B23D 61/06* (2006.01)
(52) U.S. Cl.
CPC .................................. *B23D 61/06* (2013.01)
(58) Field of Classification Search
CPC ...... B23D 61/06; B23D 61/04; B23D 61/065; B22G 13/01; A01G 23/091; Y10T 83/9319; Y10T 83/935; Y10T 83/9329; Y10T 83/9336; Y10T 83/9338; B27B 33/08; B02C 18/182; B23C 5/202; B23C 5/207
USPC ......... 83/835, 839, 837, 828, 940, 842, 843; 144/241, 228, 34.1, 225; 407/42, 36, 40; D15/139
See application file for complete search history.

(56) References Cited

U.S. PATENT DOCUMENTS

| | | | |
|---|---|---|---|
| 4,739,557 A | 4/1988 | Wagner | |
| 5,307,719 A | 5/1994 | Maclennan | |
| 5,481,952 A | 1/1996 | Maclennan | |
| 5,644,965 A * | 7/1997 | MacLennan | B23D 61/06 |
| | | | 144/241 |
| 8,430,009 B2 * | 4/2013 | Micacchi | B27B 33/08 |
| | | | 83/837 |
| 9,687,997 B2 | 6/2017 | Micacchi | |
| D804,551 S * | 12/2017 | Rhode | D15/139 |
| 10,272,508 B2 * | 4/2019 | MacLennan | B23D 61/065 |

(Continued)

OTHER PUBLICATIONS

International Search Report and Written Opinion for International Application No. PCT/CA2019/050717, dated Aug. 20, 2019, 7 pages.

*Primary Examiner* — Ghassem Alie
(74) *Attorney, Agent, or Firm* — Stoel Rives LLP

(57) ABSTRACT

A replaceable tooth for a circular saw with a base and angled cutting surfaces defining nadirs of intersection between adjacent cutting surfaces. Inserts are provided to cover facets of the angled cutting surfaces of the replaceable tooth. Plugs of a hardened material are provided immediately below each nadir of intersection to prevent erosion of the tooth base below the intersections of the inserts.

4 Claims, 4 Drawing Sheets

(56) References Cited

U.S. PATENT DOCUMENTS 10,981,240 B2 * 4/2021 Rhode .................... B27B 33/02
2003/0188619 A1 * 10/2003 MacLennan ........... B23D 61/04
83/839

* cited by examiner

REPLACEABLE TOOTH FOR A CIRCULAR SAW

RELATED APPLICATION DATA

This application is the National Stage of International Application No. PCT/CA2019/050717, filed May 24, 2019, which claims the benefit of U.S. Provisional Patent Application No. 62/679,691, filed Jun. 1, 2018, the disclosures of both of which are hereby incorporated by reference in their entireties.

FIELD OF THE INVENTION

The present invention relates to an improved replaceable tooth for circular saws.

BACKGROUND OF THE INVENTION

It has become common to use a replaceable saw tooth comprising a base with V-shaped cutting members as exemplified in U.S. Pat. No. 5,644,965 to MacLennan et al. The V-shaped cutting members are angled in relation to one another to present raised tips and to define a nadir of intersection between adjacent cutting members. Carbide inserts are typically provided to overlie the facets of the cutting members that engage the wood, with the inserts abutting one another at the nadirs of intersection.

However, points of abutment of the inserts at the nadirs of intersection remain weak points for wear. The intersecting edges of the inserts tend to wear forming a gap and thereafter forming a groove that extends below the gap and into the metal forming the body of the tooth. Such wear sometimes extends past the tooth itself and into the non-replaceable tooth holder that is mounted on the saw blade. That in turn requires maintenance of the saw blade and holder itself, which is considerably more inconvenient and costly than merely replacing a tooth.

FIGS. 1 and 3 show an example of a prior art tooth 10 mounted on a tooth holder 26 of a circular saw 2. Tooth 10 has inserts 28 that come together and at nadirs of intersection 22. The tooth 10 as shown in FIGS. 1 and 2 is unused and newly installed on tooth holder 26 by a bolt 20.

FIGS. 2 and 4 show the same prior art tooth 10 after a period of use. As best seen in FIG. 4, the wear created during use of the tooth forms a groove 50 beginning at the portion of the inserts 28 located at the nadirs of intersection 22 and extending down the side of tooth 10. Depending on the duration and conditions of use, groove 50 may also extend down the side of tooth holder 26.

A solution offered by MacLennan in U.S. Pat. No. 5,307,719 is to overlap the carbide inserts at their junction, thereby presenting greater resistance to wear and delaying the creation of a gap between the inserts.

The present invention is an alternative approach to avoiding wear below the intersection nadirs of the inserts.

It is therefore an object of this invention to provide a solution to the problem of wear below the cutting surfaces of a tooth and in the underlying holder.

This and other objects will be better understood by reference to this application as a whole. Not all of the objects are necessarily met by all embodiments of the invention described below or by the invention defined by each of the claims.

SUMMARY OF THE INVENTION

In one aspect, the invention comprises a replaceable tooth for a circular saw having a plug immediately below the intersections of adjacent cutting teeth. The plugs are made of a hardened material that prevents wear down the side of the tooth.

In another aspect, the invention is a replaceable tooth for a circular saw having a tooth base of a first material, a plurality of substantially triangular cutting surface, a plurality of inserts, and at lease one plug of a second material that is more erosion resistant than the first material. The plurality of substantially triangular cutting surfaces extend above the base. Each of the cutting surfaces have a facet that is angled in relation to the facets of adjacent cutting surfaces. The adjacent cutting surfaces define nadirs of intersection between the adjacent cutting surfaces. The plurality of inserts cover the angled facets. The at least one plug is located immediately below at least one of the nadirs of intersection.

In another aspect, each of the nadirs of intersection has a plug of the second material immediately below.

In a further aspect, the first material is steel and the second material is carbide.

In yet a further aspect, the carbide is tungsten carbide.

BRIEF DESCRIPTION OF THE DRAWINGS

At least one mode for carrying out the invention in terms of one or more examples will be described by reference to the drawings thereof in which.

DETAILED DESCRIPTION OF AT LEAST ONE MODE FOR CARRYING OUT THE INVENTION IN TERMS OF EXAMPLE(S)

Figure 1:
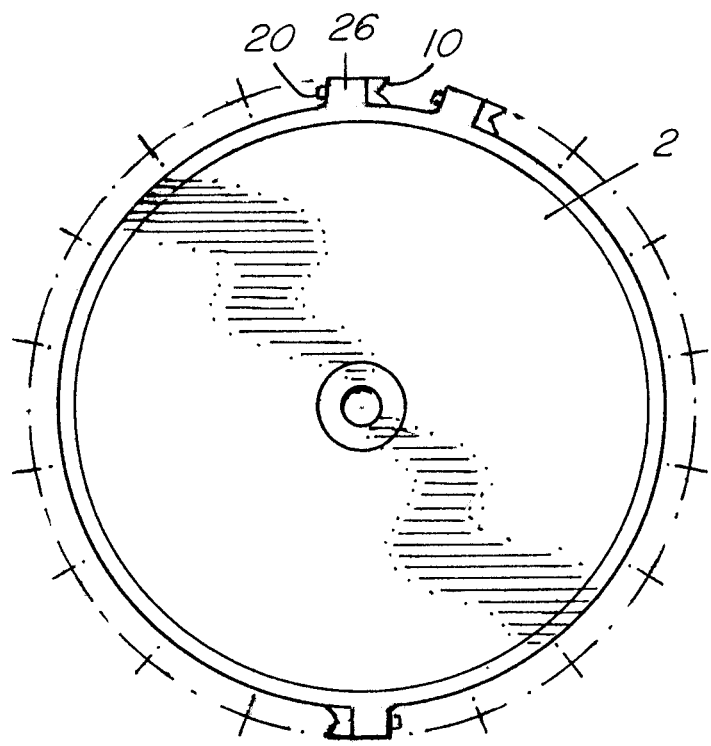
FIG. 1 is plan view of a circular saw with prior art teeth before use of the teeth.
Figure 2:
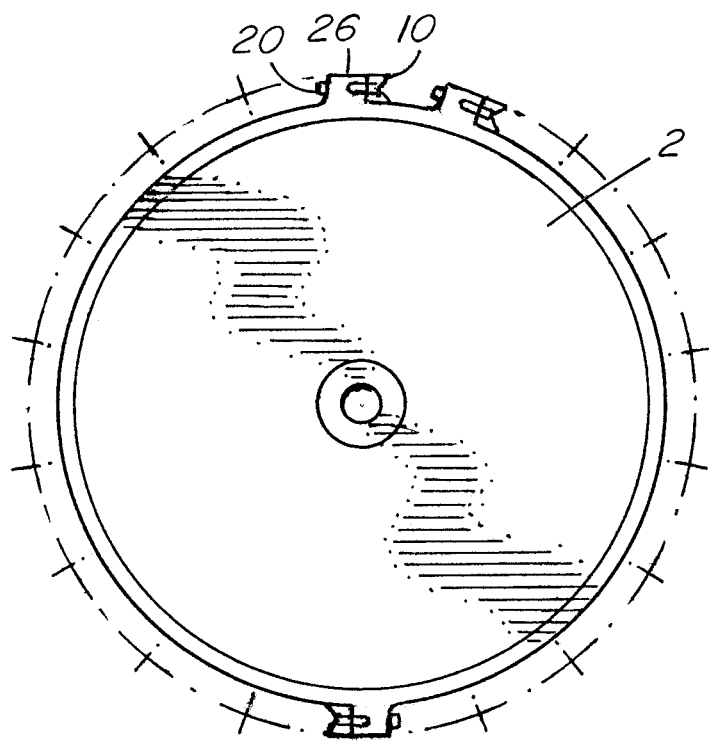
FIG. 2 is a plan view of a circular saw with prior art teeth after use of the teeth and showing a groove etched by wear extending down the length of the teeth and across a portion of the saw holders for the teeth.
Figure 3:
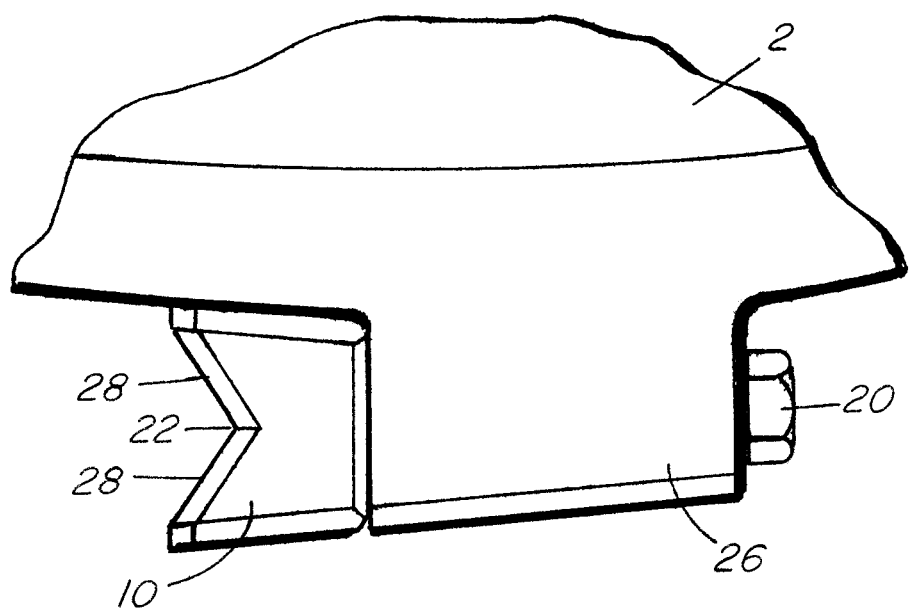
FIG. 3 is a plan view of a portion of the saw blade shown in FIG. 1, one tooth, and a bolt for securing the tooth to the saw blade.
Figure 5:
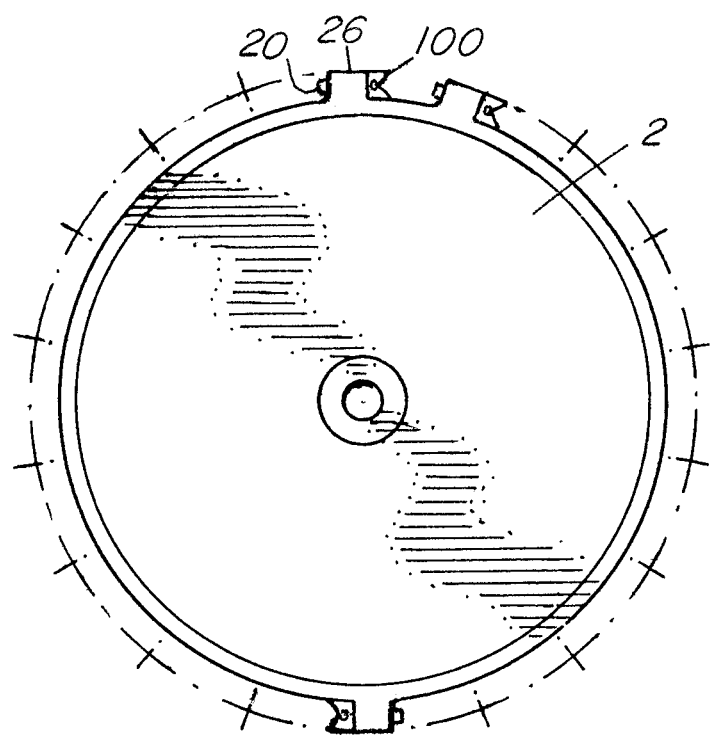
FIG. 5 is a plan view of a circular saw blade with teeth according to the preferred embodiment of the invention.
Figure 6:
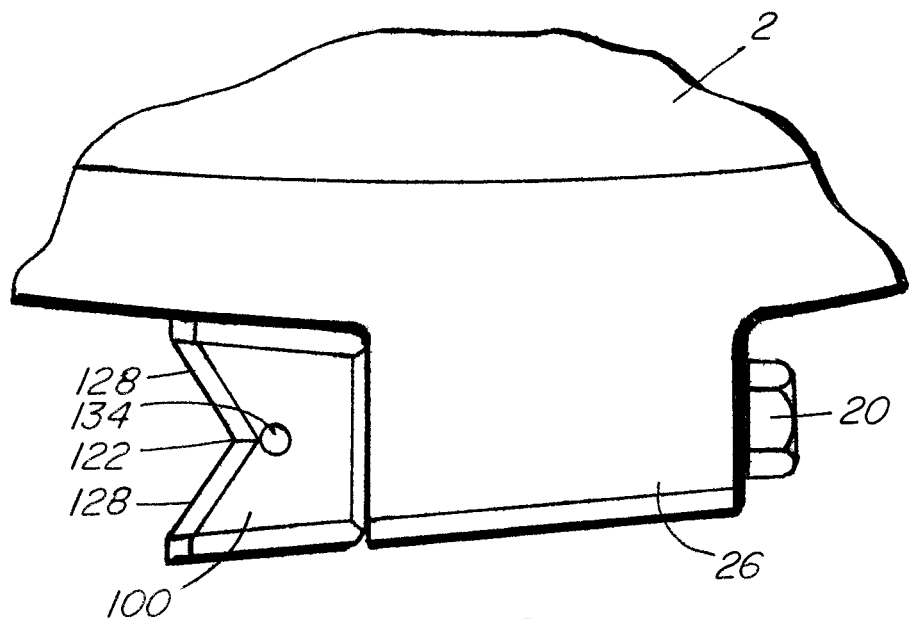
FIG. 6 is a plan view of a portion of the saw blade shown in FIG. 5, one tooth according to the preferred embodiment, and a bolt for securing the tooth to the saw blade.

FIGS. 5 and 6 show tooth 100 according to the preferred embodiment mounted on tooth holder 26 of circular saw 2. A series of tooth holders (for instance eighteen holders) normally extend around the circumference of the circular saw. FIG. 5 (and FIGS. 1 and 2) show only three tooth holders 26 of the series around the saw (i.e. the remaining tooth holders are not depicted).

FIGS. 7 to 11 collectively show several views of tooth 100 in isolation.

The tooth 100 includes a base 112 having angled V-shaped cutting surfaces 114 extending above the base 112 and terminating in raised tips 116. The cutting surfaces 114 are substantially triangular or frusto-pyramidal in shape having facets 130 (FIG. 10 wherein the inserts are not shown) that are angled in relation to the facets of adjacent cutting surfaces 114. The base 112 and the cutting surfaces 114 are typically made of metal such as steel.

The tips 116 of the cutting surfaces 114 define apices of the outer perimeter of the tooth 100. The bottom edges 118 of each cutting surface terminate at the bottom edge of the adjacent cutting surface thereby defining nadirs of intersection 122 of the adjacent cutting surfaces.

Figure 7:
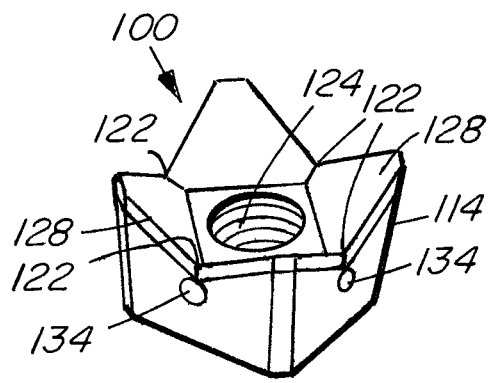
FIG. 7 is a perspective view of the tooth according to preferred embodiment.
Figure 8:
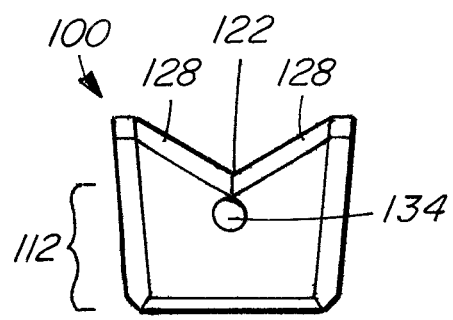
FIG. 8 is a side elevation of the tooth shown in FIG. 7.
Figure 9:
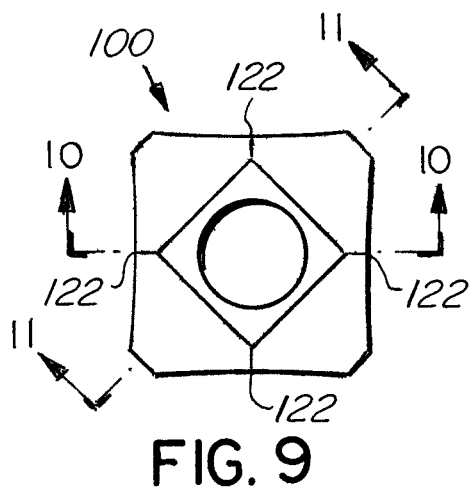
FIG. 9 is plan view of the tooth shown in FIG. 7.

The tooth 100 typically includes a central threaded bore 124 used to secure the tooth to a tooth holder 26 with a bolt 20 (see FIGS. 6 and 7).

Inserts 128, typically of carbide (for example tungsten carbide) cover the angled facets 130 of the cutting surfaces. As do the cutting surfaces 114, the inserts 128 meet by abutment at nadirs of intersection 122 about the upper surface of the tooth. The inserts 128 are of a material that is more resistant to erosion than the base 112 and cutting surfaces 114 of the tooth.

Figure 4:
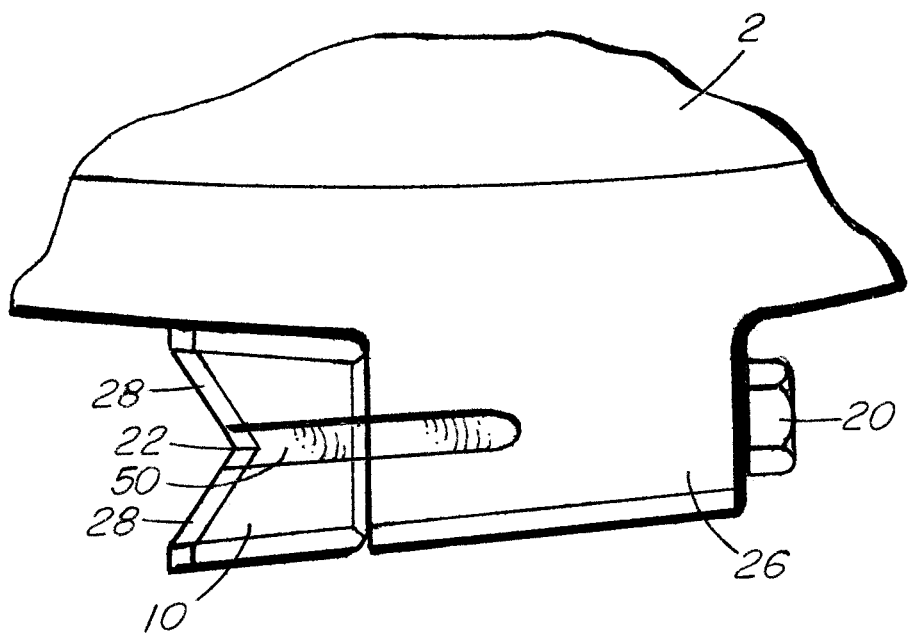
FIG. 4 is a plan view of a portion of the saw blade shown in FIG. 2, one tooth, and a bolt for securing the tooth to the saw blade.

Without further modification, the wear from repeated cutting of material erodes the edges of the inserts 28 that meet at the nadirs of intersection 22, such erosion eventually forming the grooves in the base 12 of the tooth as shown in FIG. 4, and ultimately damaging the underlying holders 26 in a similar manner.

According to the invention, plugs 134 of hardened material, such as tungsten carbide, extends into the base 112 of the tooth, each at a point immediately below the nadir of intersection 122 between adjacent inserts 128. The plugs 134 being of a hardened material compared to the base 112 and cutting surfaces 114 are more erosion resistant and act to interrupt the progression of an etched groove by presenting a hardened obstacle to erosion. Preferably the plugs 134 are provided immediately below each nadir of intersection 122.

While plugs 134 are shown as being cylindrical, it will be appreciated that other shapes are possible.

Figure 10:
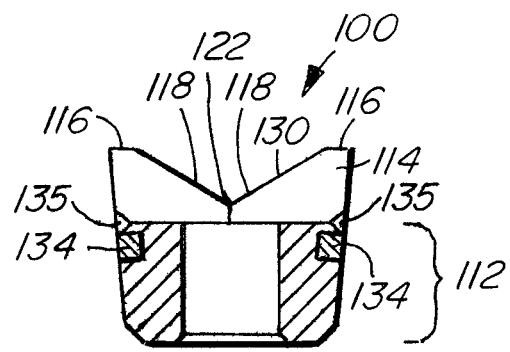
FIG. 10 is a view taken along line 10-10 of FIG. 9 and without the inserts; and, FIG. 11 is a view taken along line 11-11 of FIG. 9.
Figure 11:
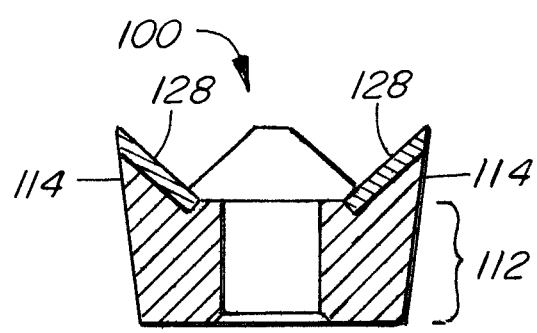

Now referring to the cross-sectional view of the tooth 100 in FIG. 10, there may be gaps 135 in the metal above each of the plugs 134. When the carbide inserts 128 (shown in FIG. 7) are brazed to the tooth, the gaps 135 are filled in with carbide.

In the foregoing description, a preferred means of carrying out the invention has been described. However, the specification and drawings are to be regarded in an illustrative rather than a restrictive sense.

The invention claimed is:

1. A replaceable tooth for a circular saw comprising:
    a tooth base of a first material;
    a plurality of substantially triangular cutting surfaces extending above said base;
    each substantially triangular cutting surface of said plurality of substantially triangular cutting surfaces having a facet that is angled in relation to the facets of adjacent substantially triangular cutting surfaces of said plurality of substantially triangular cutting surfaces;
    said adjacent substantially triangular cutting surfaces defining nadirs of intersection between said adjacent substantially triangular cutting surfaces;
    a plurality of inserts covering said angled facets; and,
    at least one plug of a second material located immediately below at least one of said nadirs of intersection, said second material being more erosion resistant than said first material.

2. The replaceable tooth of claim 1 wherein each of said nadirs of intersection has a plug of said second material immediately below.

3. The replaceable tooth of claim 2 wherein said first material is steel and wherein said second material is carbide.

4. The replaceable tooth of claim 3 wherein said carbide is tungsten carbide.

* * * * *